(12) United States Patent
Selén et al.

(10) Patent No.: US 8,995,341 B2
(45) Date of Patent: Mar. 31, 2015

(54) PILOT SHIFTING

(75) Inventors: Yngve Selén, Uppsala (SE); Robert Baldemair, Solna (SE); Joachim Sachs, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 174 days.

(21) Appl. No.: 13/510,438

(22) PCT Filed: May 30, 2011

(86) PCT No.: PCT/EP2011/058833
§ 371 (c)(1),
(2), (4) Date: May 17, 2012

(87) PCT Pub. No.: WO2012/163399
PCT Pub. Date: Dec. 6, 2012

(65) Prior Publication Data
US 2012/0307729 A1 Dec. 6, 2012

(51) Int. Cl.
*H04W 72/12* (2009.01)
*H04L 5/00* (2006.01)
*H04L 25/02* (2006.01)

(52) U.S. Cl.
CPC ............ *H04L 5/0032* (2013.01); *H04L 5/0048* (2013.01); *H04L 25/0224* (2013.01); *H04L 5/0062* (2013.01)
USPC ............................. 370/328; 370/343; 370/345

(58) Field of Classification Search
None
See application file for complete search history.

(56) References Cited

U.S. PATENT DOCUMENTS

| | | | |
|---|---|---|---|
| 2006/0209666 A1* | 9/2006 | Gerlach | 370/203 |
| 2007/0104174 A1* | 5/2007 | Nystrom et al. | 370/343 |
| 2010/0074358 A1* | 3/2010 | Khojastepour et al. | 375/267 |
| 2010/0190447 A1* | 7/2010 | Agrawal et al. | 455/63.1 |
| 2010/0232384 A1* | 9/2010 | Farajidana et al. | 370/329 |
| 2011/0199921 A1* | 8/2011 | Damnjanovic et al. | 370/252 |

(Continued)

OTHER PUBLICATIONS

Budiarjo, I. et al. "On the Use of Virtual Pilots with Decision Directed Method in OFDM Based Cognitive Radio Channel Estimation Using 2x1-D Wiener Filter." IEEE International Conference on Communications, 2008, May 19-23, 2008, pp. 703-707, Beijing, China.

(Continued)

*Primary Examiner* — Anh-Vu Ly
*Assistant Examiner* — Hashim Bhatti
(74) *Attorney, Agent, or Firm* — Murphy Bilak & Homiller, PLLC

(57) ABSTRACT

In an example embodiment, a network node transmits secondary signal component of a combined wireless communication signal to a user equipment. The combined wireless communication signal includes the secondary signal component and a primary signal component. Secondary pilot resources of the secondary signal component are dynamically shifted relative to primary pilot resources of the primary signal component by an amount that is based on whether a current estimation procedure at the user equipment is a primary channel estimation procedure or a secondary channel estimation procedure. In a corresponding example embodiment, the user equipment receives the combined wireless communication signal with the dynamically shifted pilot resources. The user equipment estimates the primary channel in the primary channel estimation procedure and estimates the secondary channel in the secondary channel estimation procedure.

24 Claims, 11 Drawing Sheets

(56) References Cited

U.S. PATENT DOCUMENTS

2012/0014477 A1* 1/2012 Ko et al. .................. 375/299
2012/0287974 A1* 11/2012 Muralidhar et al. .......... 375/219

OTHER PUBLICATIONS

Hosseini, H. et al. "CSI Feedback Model in the Context of Adaptive Cognitive Radio Systems." 2009 Third Asia International Conference on Modelling & Simulation, May 25-29, 2009, pp. 681-686, Bali, Indonesia.

Rashad, I. et al. "Efficient Pilot Pattern for OFDM-based Cognitive Radio Channel Estimation—Part 1." 14th IEEE Symposium on Communications and Vehicular Technology in the Benelux, Nov. 15, 2007, pp. 1-5, Delft, Netherlands.

Sachs, Joachim et al., "Cognitive Cellular Systems within the TV Spectrum", 2010 IEEE Symposium on New Frontiers in Dynamic Spectrum, Singapore, Apr. 6-9, 2010, pp. 1-12.

Selén, Yngve et al., "A Short Feasibility Study of a Cognitive TV Black Space System", 2011 IEEE 22nd International Symposium on Person Indoor and Mobile Radio Communications (PIMRC), Toronto, Ontario, Canada, Sep. 11-14, 2011, pp. 520-524.

Unknown, Author, "*Noah Systems, Inc.* v. *Intuit Inc.*", 102 U.S.P.Q. 2d 1410, 675 F.3d 1302, No. 2011-1390, United States Court of Appeals, Federal Circuit, Apr. 9, 2012, pp. 1-13.

* cited by examiner

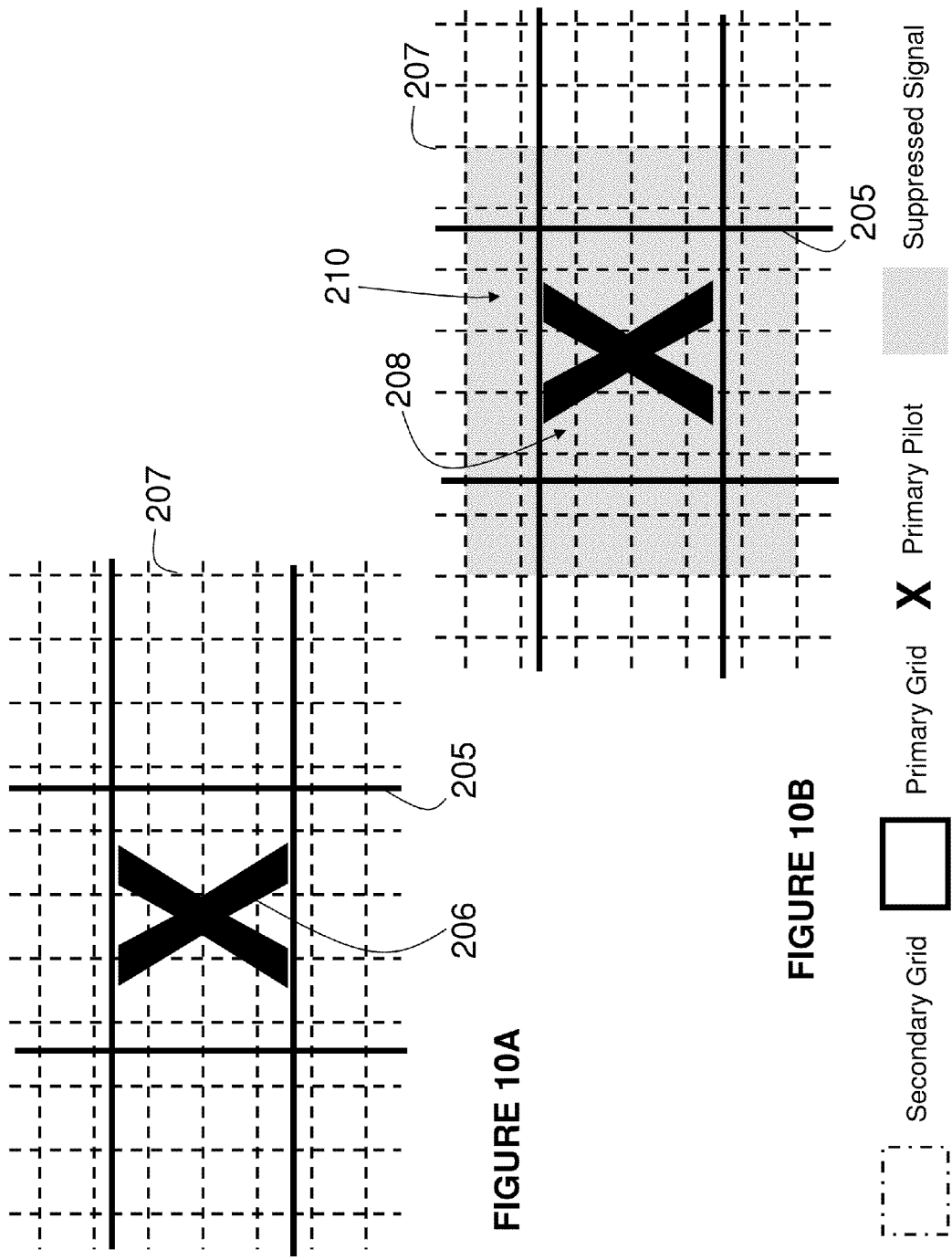

PILOT SHIFTING

TECHNICAL FIELD

Some example embodiments presented herein may be directed towards a method in a Base Station for the dynamic shifting of pilot resources in an overlay communications system. Some example embodiments may be directed towards a method in an user equipment for the estimation of channels in an overlay communications system as a function of the dynamic shifting.

BACKGROUND

The use of mobile broadband (MBB) services is rapidly increasing in all regions of the world as a result of the ongoing transition from cellular telephony to MBB. Mobile data surpassed voice during December 2009 and yearly traffic increases in the order of 200% to 300% have been measured in real networks. This increase is predicted to continue.

Mobile operators now face the challenge of handling this immense traffic increase in their networks. One trend in radio research and regulation is based on the observation that many legacy systems are not using their spectrum very efficiently. While replanning of such legacy systems could free up spectrum for licensed mobile use, significant efforts in research, standardization, and regulation are being spent on finding ways of getting higher spectrum utilization in these bands by means of secondary usage of said spectrum.

A secondary user in this context is an user which is not using the spectrum for its licensed purpose and has obligations to not cause harmful interference to the licensed, or primary, usage. The broadcast TV systems have become the prime target for secondary spectrum usage and regulatory bodies already have rules in place for secondary usage. The main reasons for the interest in the TV spectrum are the stationary and predictability characteristics of the TV transmitters as well as the high value of the TV spectrum bands.

The presence of secondary users implies some sharing of spectrum bands between primary and secondary systems. The sharing of spectrum between two systems is usually grouped into one of the following three categories or approaches: (1) the overlay approach; (2) the underlay approach; or (3) the interweave approach.

The underlay approach uses a very low power per unit of bandwidth such that the interference caused to the primary system is kept below a defined level denoted the interference temperature. This level could be on the order of, or below, the thermal noise.

The interweave approach is the primary-secondary spectrum sharing approach. In this approach the signals of the secondary systems are orthogonalized to the primary signals in the time, frequency, and/or spatial domain(s). This can be achieved by, e.g., letting the secondary systems communicate on time/frequency resources that are unused by primary systems. Another type of interweave is spatial/frequency orthogonalization where channels unused by the primary system at certain locations can be used by secondary systems.

In the overlay approach the secondary system cooperates with the primary system and uses the same spectrum resources for its communication. This can be achieved by, e.g., letting the secondary system forward the primary signals while also transmitting secondary signals on the same communication resources. The approach involves interference management by the secondary system where one possible mechanism is interference cancellation at the secondary receivers in which the primary signal is decoded, reconstructed and subtracted from the received signal which then, ideally, only contains the secondary signal.

Studies show that the channel estimation performance may be an important parameter for the sharing of communication resources. For example, if the channel estimates are poor, the achievable secondary system SNRs will be very low. A straightforward implementation of a shared system transmitter just superimposes the secondary signals on the primary signals without making any modifications of the signal design. This results in the optimal channel estimation performance not being achieved, which limits the performance of the secondary system.

SUMMARY

Thus, at least one object of some of the example embodiments herein may be to provide an improved method of signaling transmission. Some example embodiments may be directed towards a method in a network node for transmitting a combined wireless communication signal. The combined wireless communication signal comprises a primary and a secondary signal component. The network node is comprised in a Radio Network. The method comprises transmitting the secondary signal component to be received by an user equipment. The secondary signal component comprises secondary pilot resources that are dynamically shifted. The dynamic shifting is based on a current estimation procedure.

Some example embodiments may be directed towards a method in an user equipment for estimating a primary and a secondary channel, wherein the secondary channel is a subset of the primary channel. The user equipment is comprised in a Radio Network. The method comprises receiving from a network node a combined wireless communication signal. The combined wireless communication signal comprises primary and secondary signal components, where the secondary pilot resources of the secondary signal component are shifted based on a current estimation procedure. The method also comprises estimating the primary channel when the current estimation procedure is a primary channel estimation procedure, and estimating the secondary channel when the current estimation procedure is a secondary channel estimation procedure.

Some example embodiments may be directed towards a network node for transmitting a combined wireless communication signal, the combined wireless communication signal comprises a primary and a secondary signal component. The network node is comprised in a Radio Network. The network node comprises a communications port that may be configured to transmit the secondary signal component to an user equipment. The network node also comprises a shifting unit that is configured to dynamically shift secondary pilot resources of the secondary signal component based on a current estimation procedure.

Some example embodiments may be directed towards an user equipment for estimating a primary and a secondary channel, wherein the secondary channel is a subset of the primary channel. The user equipment is comprised in a Radio Network. The user equipment comprises a communications port that is configured to receive from a network node a combined wireless communication signal. The combined wireless communication signal comprises primary and secondary signal components, where secondary pilot resources of the secondary signal component are shifted based on a current estimation procedure. The user equipment also comprises an estimation unit that is configured to estimate the primary channel when the current estimation procedure is a primary channel estimation procedure. The estimation unit is also configured to estimate the secondary channel when the current estimation procedure is a secondary channel estimation procedure.

Thus, as described above, the example embodiments presented herein describe secondary system pilot resource shifting for improving channel estimation performance. For example, an amount of pilot resource shifting of the secondary system may be selected in order to obtain a desired degree of overlap between the primary and secondary system pilots. This results in a decrease of interference cased by the secondary and primary systems thereby improving the accuracy of the channel estimations.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 10A and 10B are illustrative example of signal suppression, according to some of the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Introduction

Figure 1:
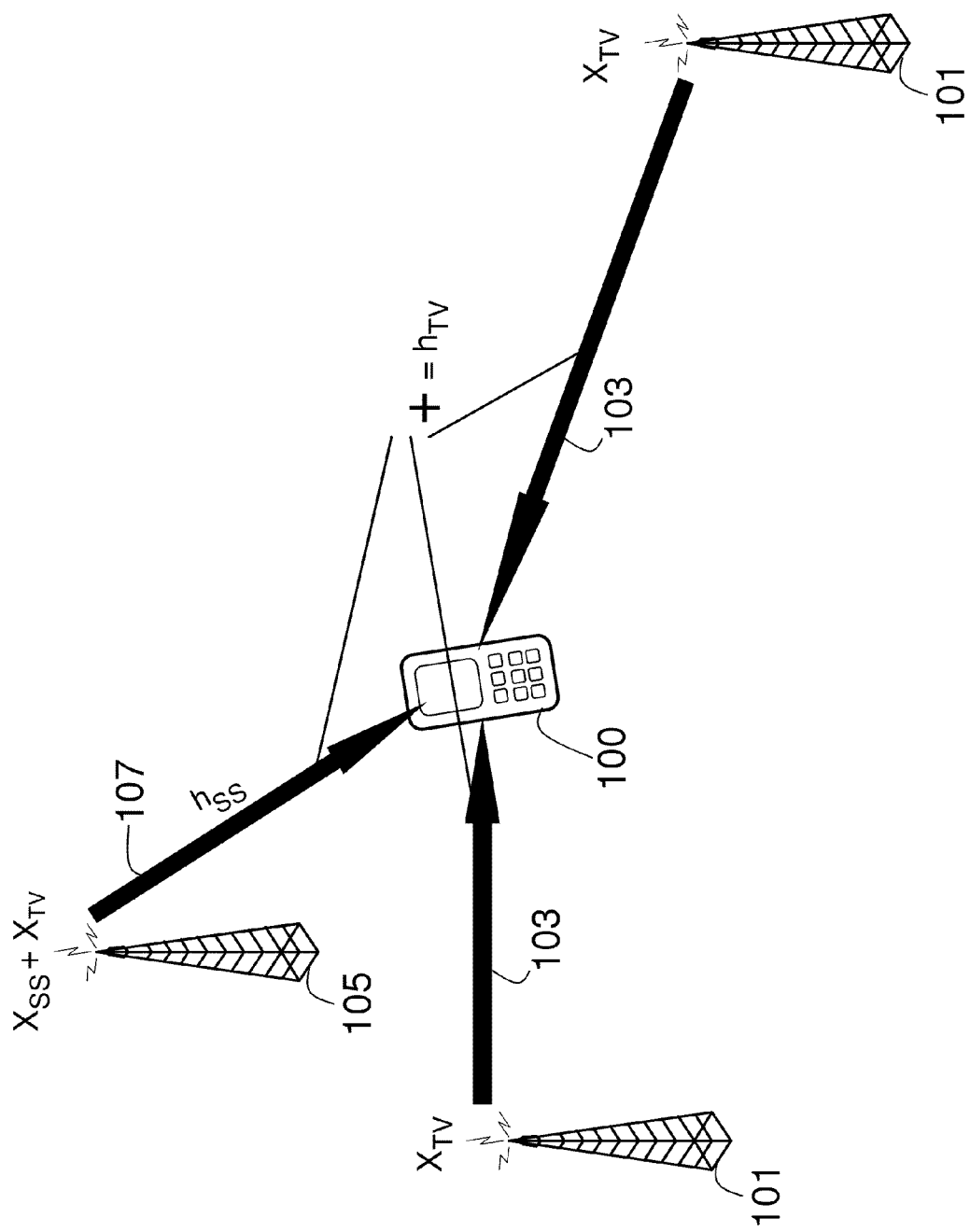
FIG. 1 is a schematic of an overlay communications system, according to some of the example embodiments.

FIG. 1 depicts an example of an overlay communication system. An overlay communication system is a system which utilizes spectrum sharing in the transmission of wireless communications. An overlay system typically involves a primary and secondary communication system. In the example provided by FIG. 1, the primary system may comprise a television broadcast system. The television broadcast system may comprise any number of transmitters 101 that may be configured to transmit wireless television signals, $X_{TV}$, (e.g., a primary signal component) on a primary channel, $h_{TV}$, 103. The primary channel may also be configured to transmit secondary signal components from a secondary system, as explained below.

In the example provided by FIG. 1, the secondary system may comprise a mobile communication system. The mobile broadband communications system may comprise any number of transmitters or Base Stations 105 that may be configured to simultaneously transmit a combined wireless signal on a secondary channel, $h_{SS}$, 107. The combined wireless signal may comprise the wireless television signal, $X_{TV}$, (e.g., the primary signal component) as well as a wireless communication signal, $X_{SS}$, (e.g., a secondary signal component).

Since the secondary channel, $h_{SS}$, conveys both primary and secondary signal components, the secondary channel may be considered a sub-set of the overall primary channel, $h_{TV}$, as shown in FIG. 1. Therefore, the secondary channel, $h_{SS}$, and the primary channel, $h_{TV}$, may comprise common sub-components.

It should be appreciated that the television broadcast and mobile broadband systems are used merely as examples. The example embodiments disclosed herein may be applied to any system utilized for transmitting any form of wireless data known in the art.

Figure 2:
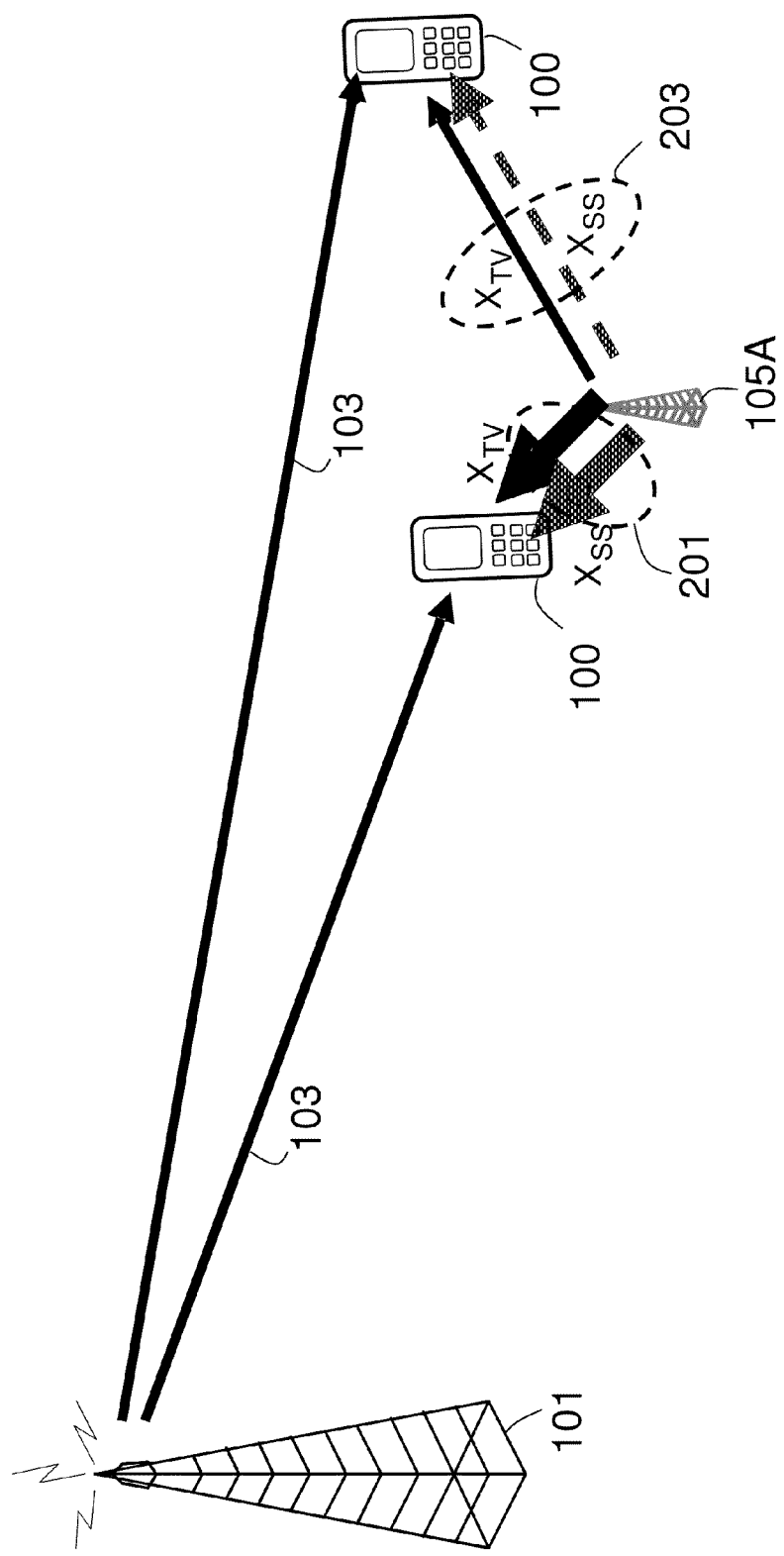
FIG. 2 is a schematic of an overlay communications system comprising a cognitive transmitter, according to some of the example embodiments.

FIG. 2 illustrates a cognitive overlay communications system. In the cognitive overlay communications system, cognitive secondary system transmitters 105A may be configured to transmit the primary signal and secondary wireless signal simultaneously 201, as described in relation to FIG. 1. The cognitive secondary system transmitters 105A may also be configured to transmit the primary signal and secondary wireless signal according to a transmission pattern 203. An example of a transmission pattern 203 may be an alternate transmission of the primary and secondary signals, such that the primary and secondary signals are not transmitted simultaneously. It should be appreciated that the alternate transmission pattern need not occur during the entire duration of the transmission, for example, transmission patterns may be applied during predetermined periods of transmission. It should be appreciated that any other type of transmission pattern may be employed. For example, the primary signal may be continuously transmitted while the secondary signal is transmitted at predetermined time intervals.

A mobile device, for example user equipment 100, may be configured to receive communications from transmitters belonging to both the primary and secondary systems. The received signal may be represented, for example, as follows:

$$Y = H_{TV}X_{TV} + H_{SS}X_{SS} + E_1 + H_{SS}E_2 + N \quad (1)$$

where Y is the combined received signal, $X_{TV}$ is the primary signal component (e.g., television broadcast signal), $X_{SS}$ is the secondary signal component (e.g., cellular communication signal), N is thermal noise and interference, $H_{TV}$ is the superposition of wireless channels that participate in the single-frequency broadcast of television signals, $H_{SS}$ describes the wireless channel experienced by the signal transmitted from the secondary system, $E_2$ is the Error Vector Magnitude (EVM) noise generated by transmitters used to generate $X_{SS}$ and $X_{TV}$, and $E_1$ is the EVM noise generated by all other transmitters in the overlay system and filtered by the channel.

After channel estimation, decoding, reconstruction, and cancellation of the primary television signal $X_{TV}$, the residual signal becomes:

$$Y_{SS}=(H_1-H_{est})X_{TV}+H_{SS}X_{SS}+E_1+H_{SS}E_2+N \quad (2)$$

where $H_{est}$ denotes the estimated primary channel. It should be noted that the primary signal remains due to imperfect channel estimation. The channel estimation performance (e.g., how similar $H_{est}$ is to $H_{TV}$) plays a role when it comes to evaluation of the achievable Signal to Interference plus Noise Ratio (SINR) of $Y_{SS}$.

Thus, at least one object of some of the example embodiments herein may be to provide an improved method of signaling transmission. The technical effect of this object may be to provide improved channel estimations without greatly increasing the amount hardware components or system resources.

Specifically, some example embodiments presented herein may be directed towards an improved channel estimation. Some example embodiments may be applied to a Base Station and/or user equipment node. Some example embodiments may be applied to methods of primary and/or secondary channel estimations. Some example embodiments may utilize pilot resource shifting in conjunction with the primary and/or secondary channel estimations. It should be appreciated that the example embodiments may be applied to other nodes in a Radio network.

The example embodiments will be further described below according to the respective sub-headings. First example configurations of a Base Station and user equipment will be provided. Thereafter, some example embodiments directed towards secondary channel estimation will be described. Thereafter, some example embodiment directed towards pilot resource shifting will be provided. Pilot resource shifting may be related to a method of signal transmission which may be utilized for channel estimations. Example embodiments directed towards cognitive transmission will also be provided. Thereafter, some example embodiments directed towards primary channel estimation will be provided.

It should be appreciated that a primary channel estimation procedure herein refers to the primary channel being estimated and the secondary channel may be estimated with use of the primary channel estimation (i.e., based on the primary pilot resources). A secondary channel estimation procedure refers to the use of secondary pilot resources to estimate the secondary channel.

Base Station Configuration

Figure 3:
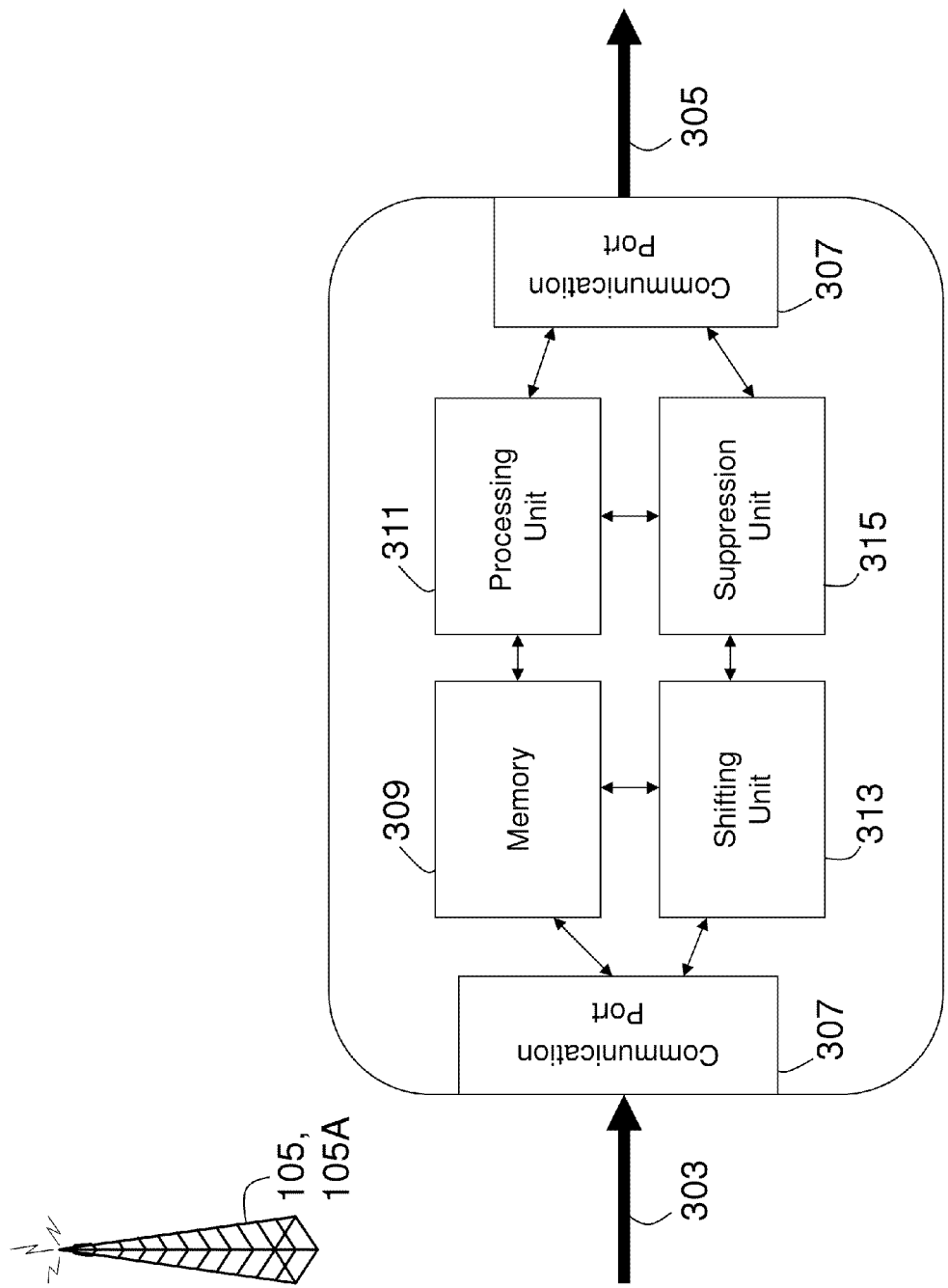
FIG. 3 is a schematic of a Base Station, according to some of the example embodiments.

FIG. 3 provides an illustrative example of a Base Station network node configuration, according to some of the example embodiments. The Base Station 101, 105, or 105A may comprise any number of communication ports 307. The communication ports 307 may be configured to receive and transmit any form of communications data 303 and 305, respectively. It should be appreciated that the Base Station 101, 105, or 105A may alternatively comprise a single transceiver port. It should further be appreciated that the communication or transceiver port may be in the form of any input/output communications port known in the art.

The Base Station 101, 105, or 105A may further comprise at least one memory unit 309 that may be in communication with the communication ports 307. The memory unit 309 may be configured to store received, transmitted, and/or measured data of any kind and/or executable program instructions. The memory unit 309 be any suitable type of computer readable memory and may be of a volatile and/or non-volatile type.

The Base Station 101, 105, or 105A may also comprise a shifting unit 313 that may be configured to shift pilot resources of the primary and/or secondary signals. The Base Station 101, 105, or 105A may further comprise a suppression unit 315 that may be configured to suppress, puncture, and/or mute the transmission of the primary and/or secondary signal components. The Base Station 101, 105, or 105A may also comprise a general processing unit 311.

It should be appreciated that the shifting unit 313, the suppression unit 315, and/or the processing unit 311 may be any suitable type of computation unit, e.g. a microprocessor, digital signal processor (DSP), field programmable gate array (FPGA), or application specific integrated circuit (ASIC). It should also be appreciated that the shifting unit 313, the suppression unit 315, and/or the processing unit 311 need not be comprised as separate units. The shifting unit 313, the suppression unit 315, and/or the processing unit 311 may be comprised as a single computational unit or any number of units.

User Equipment Configuration

Figure 4:
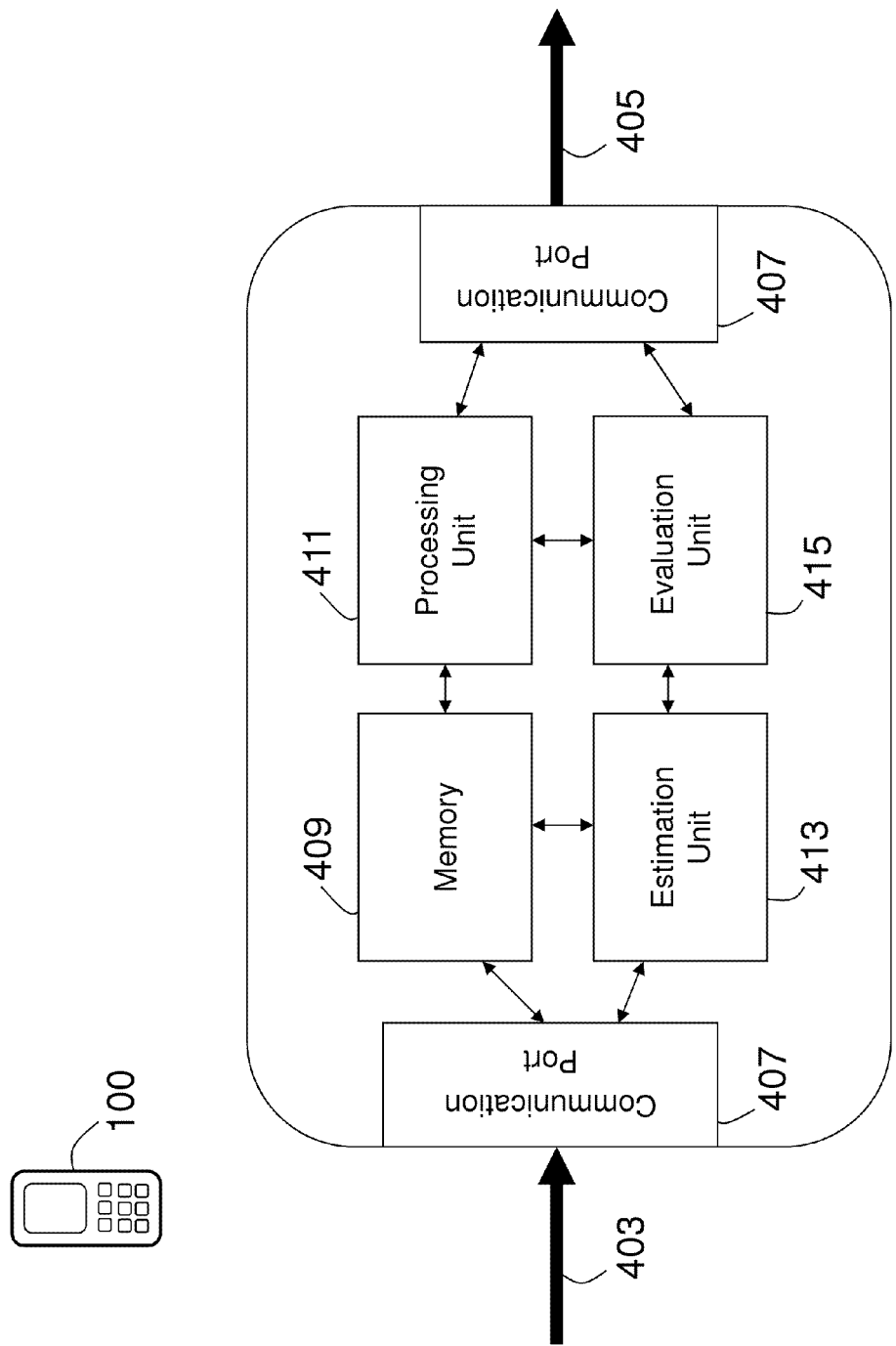
FIG. 4 is a schematic of an user equipment, according to some of the example embodiments.

FIG. 4 provides an illustrative example of an user equipment network node configuration, according to some of the example embodiments. The user equipment 100 may comprise any number of communication ports 407. The communication ports 407 may be configured to receive and transmit any form of communications data 403 and 405, respectively. It should be appreciated that the user equipment 100 may alternatively comprise a single transceiver port. It should further be appreciated that the communication or transceiver port may be in the form of any input/output communications port known in the art.

The user equipment 100 may further comprise at least one memory unit 409 that may be in communication with the communication ports 407. The memory unit 409 may be configured to store received, transmitted, and/or measured data of any kind and/or executable program instructions. The memory unit 409 be any suitable type of computer readable memory and may be of a volatile and/or non-volatile type.

The user equipment 100 may also comprise an estimation unit 413 that may be configured to estimate the primary and/or secondary signals and/or the primary and/or secondary communication channels. The user equipment 100 may further comprise an evaluation unit 415 that may be configured to determine common sub-components between the primary and secondary communication channels. The user equipment 100 may also comprise a general processing unit 411.

It should be appreciated that the estimation unit 413, the evaluation unit 415, and/or the processing unit 411 may be any suitable type of computation unit, e.g. a microprocessor, digital signal processor (DSP), field programmable gate array (FPGA), or application specific integrated circuit (ASIC). It should also be appreciated that the estimation unit 413, the evaluation unit 415, and/or the processing unit 411 need not be comprised as separate units. The estimation unit 413, the evaluation unit 415, and/or the processing unit 411 may be comprised as a single computational unit or any number of units. It should also be appreciated that the user equipment 100 may be a mobile phone, a Personal Digital Assistant (PDA), or any other wireless communications network unit capable to communicate with a base station over a radio channel.

Secondary Channel Estimation

Some example embodiments may be directed towards providing improved secondary channel estimations. In general, the secondary system channel estimate used for demodulation in the secondary system may be improved by utilizing the channel estimate from the primary system. If the primary signal is transmitted from multiple sources whereas the secondary signal is transmitted from a single source also, example embodiments may be used to identify common sub-components in the primary and secondary channel estimates, respectively, and utilize this information to derive an improved secondary system channel estimate.

By design the primary system may have more power than the secondary system. Therefore, the channel estimate formed in the primary system may be of higher quality and may be used in the secondary system. Thus, if the primary signal is transmitted by a single source, the channel estimate obtained in the primary system may be used and forwarded to the secondary system receiver. Alternatively, the user equipment may comprise a primary channel estimator which may forward the estimation information. The estimation may comprise an interpolation of the primary system channel estimate to make it compatible with the secondary system, e.g., if the primary and secondary systems are OFDM systems with different time/frequency grids. It could also comprise an extrapolation if the secondary system utilizes a larger bandwidth or larger time duration than the primary system. Alternatively, the channel estimate may be parameterized and the parameterized model may be forwarded to the secondary system.

Potentially the primary signal may be transmitted from multiple sources, e.g., neighbouring Base Stations in a Single Frequency Network (SFN) or a high tower TV transmitter. In this case the channels of the primary and secondary systems are not identical. Therefore, the primary channel may be a combination of the channel from the "other" primary system transmitters (those that are not also sending the secondary signal of interest) and the primary signal transmitter that is sending the secondary signal of interest.

Figure 5:
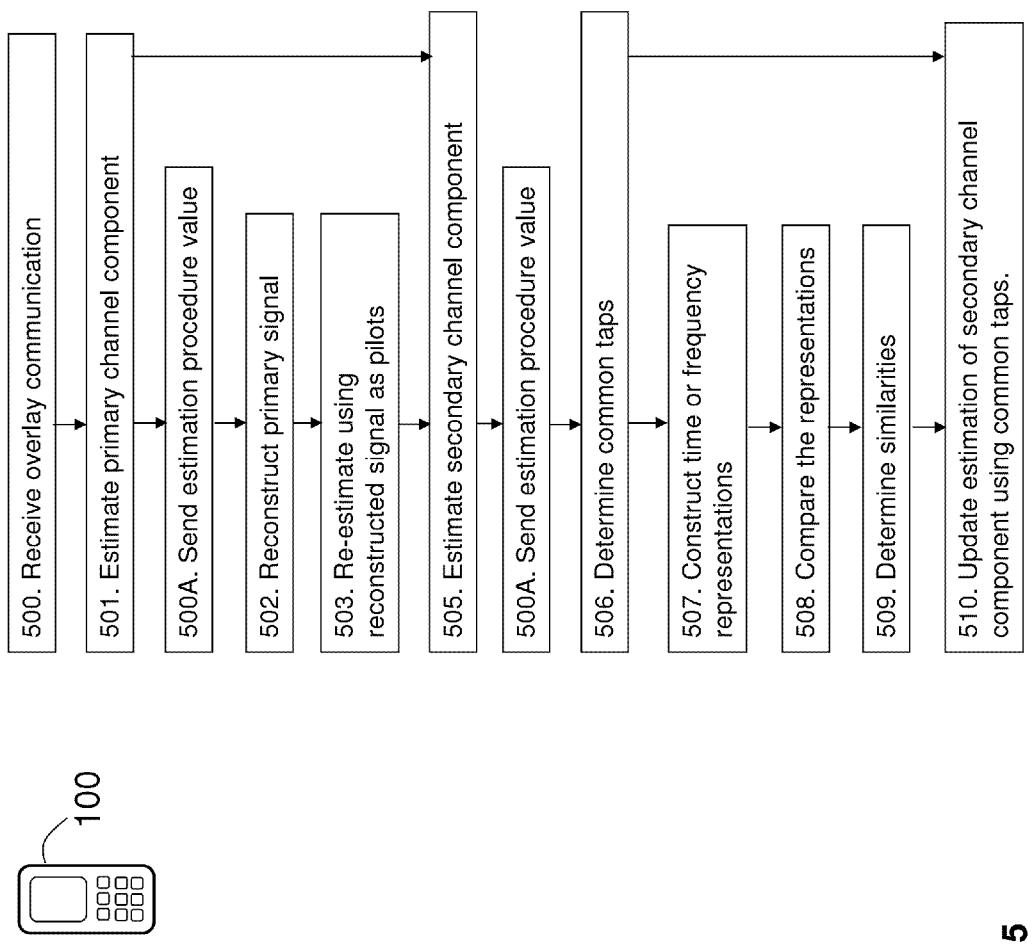
FIG. 5 is a flow diagram depicting example operations for secondary channel estimation which may be performed by the user equipment of FIG. 4, according to some of the example embodiments.

FIG. 5 illustrates a flow diagram that provides example operations which may be utilized by the user equipment network node 100 of FIG. 4 in providing secondary channel estimation, using primary channel estimation, for a multiple source scenario.

Operation 500:

Some example embodiments directed towards improved secondary channel estimation may comprise an user equipment 100 receiving 500 from a network node (e.g., a Base Station 101, 105 or 105A) a combined wireless communication signal (e.g., comprising primary and secondary signal components) through at least a portion of the primary channel.

The receiving 500 may be provided via the communications port 407. Specifically, the communications port 407 is configured to receive from the network node (e.g., Base Station 101, 105 or 105A) the combined wireless communication signal through at least a portion of the primary channel.

Operation 500A:

Prior to the performance of any channel estimations, operations may also comprise the user equipment 100 sending 500A information to a network node (e.g., Base Station 105 or 105A). The information may provide an indication of a current estimation procedure.

Such information may be used by a cognitive Base Station 105A in determining the transmission pattern of the primary and secondary signals. For example, if the user equipment 100 is under going a primary channel estimation procedure, the Base Station 105A may utilize the sent 500A information and transmit only the primary signal and the resources used for the primary channel estimation procedure. Similarly, if the user equipment 100 is under going a secondary channel estimation procedure, the Base Station 105A may utilize the sent 500A information and transmit the secondary signal such that the interference from the primary signal on the secondary pilot resources is reduced.

The information regarding the current estimation procedure may also be utilized for pilot resource shifting, which will be explained in greater detail below. For example, if the user equipment 100 is under going a primary channel estimation procedure, the sent 500A information may be utilized by the Base Station 105 or 105A to maximize an overlap between pilot resources of the primary and secondary signals. It should be appreciated that the maximizing may comprise any overlap percentage above a certain user programmable threshold. Similarly, if the user equipment 100 is under going a secondary channel estimation procedure, the Base Station 105 or 105A may utilize the sent 500A information and minimize an overlap between pilot resources of the primary and secondary signals. It should be appreciated that the minimizing may comprise any overlap percentage below a certain user programmable threshold.

Operation 501:

Upon receiving the combined wireless communication signal, operations in the user equipment 100 also comprise determining 501 an estimate of the primary channel. The estimation unit 413 and/or processing unit 411 are configured to estimate the primary channel.

Operation 502:

In some example embodiments, the determining 501 of the estimation of the primary channel may further comprise the user equipment 100 reconstructing 502 the primary signal component of the combined wireless communication signal. The reconstruction 502 may be performed with the use of the estimation unit 413 and/or the processing unit 411.

Operation 503:

The determining 501 operation may further comprise the user equipment 100 re-estimating the primary channel using the reconstructed signal as a pilot resource. The operation of reconstruction 503 may be performed with the use of the estimation unit 413 and/or the processing unit 411.

Re-estimation of the primary channel with the utilization of the reconstructed signal as a pilot resource may increase the accuracy of the primary channel estimation.

Operation 505:

After the determination 501 of the primary channel estimate has been obtained, operations further comprise the user equipment 100 determining 505 an estimate of the secondary channel. The estimation of the secondary channel may be obtained with a reconstructed secondary signal component. The reconstructed secondary signal component may be obtained by subtracting the primary signal component from the received signal. The estimation unit 413 and/or the processing unit 411 is configured to estimate the secondary channel.

Operation 506:

Upon determining 505 the secondary channel, operations further comprise determining 506 at least one common sub-component (e.g., at least one common tap) between the estimations of the primary and secondary channels. An evaluation unit 415 and/or the processing unit 411 is configured to determine the at least one common sub-component between the estimations of the primary and secondary channels. A common sub-component may be a portion of the primary and secondary channels which correspond or are similar.

Operation 507:

In determining 506 the at least one common sub-component, operations may further comprise the operation of the user equipment 100 constructing 507 a first and second time and/or frequency representation or any other parameterized representation of the estimated primary and secondary channel. The evaluation unit 415 and/or the processing unit 411 may be configured to perform the constructing 507.

Figure 6A:
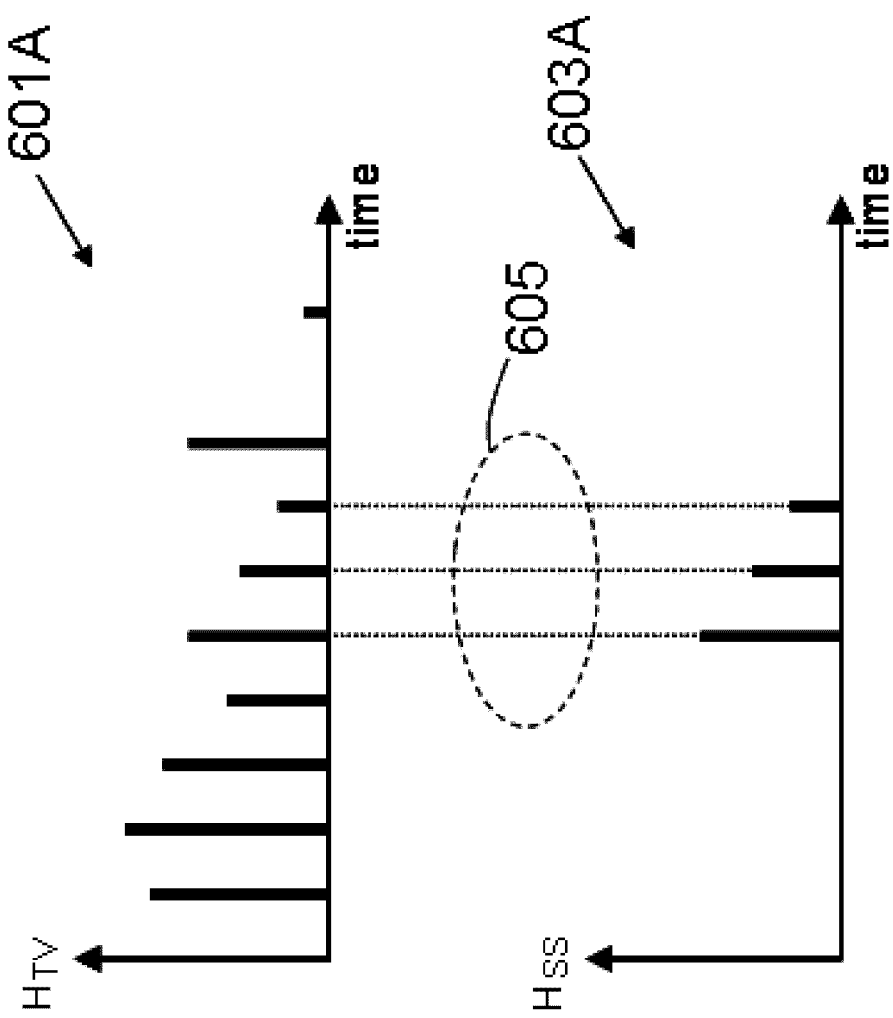
FIGS. 6A and 6B are illustrative examples of common taps between two communication channels, according to some of the example embodiments.
Figure 6B:
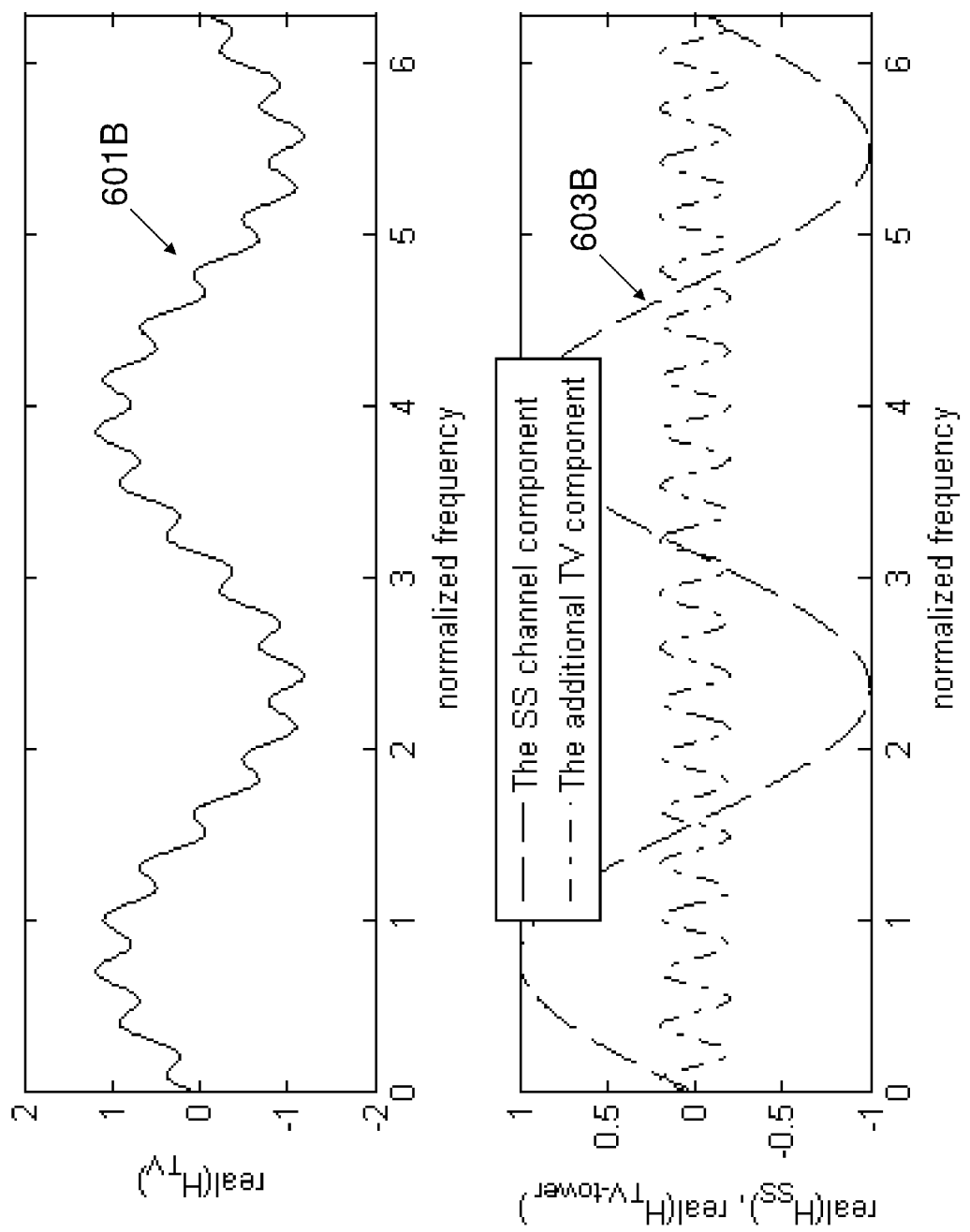

Examples of time and frequency domain representations are provided in FIGS. 6A and 6B, respectively. In FIGS. 6A and 6B, the upper graph represents the estimated channel comprising the primary and secondary channels, and the lower graph in 6A represents the secondary channel (in this case represented as taps), whereas the lower graph in 6B shows both the primary (excluding the secondary component) and secondary channels which together build up the joint channel, i.e., that is illustrated in the upper graph. The x-axis of all the graphs in FIGS. 6A and 6B represent the time and frequency, respectively.

Specifically, FIG. 6A illustrates an example of a constructed time domain representation comprising scatter responses of the estimated primary channel, $H_{TV}$, 601A. FIG. 6A also illustrates an example of a constructed time domain representation of the estimated secondary channel $H_{SS}$, 603A.

FIG. 6B illustrates an example of a constructed frequency domain representation of the estimated primary channel, $H_{TV}$, 601B. FIG. 6B also illustrates an example of a constructed frequency domain representation of the estimated secondary channel $H_{SS}$, 603B.

Operation 508:

Once the time and/or frequency domain representations or any other parameterized representation have been constructed 507, operations may further comprise the user equipment 100 comparing 508 the first and second time and/or frequency domain representations or any other parameterized representation. The comparing 508 may be performed by the evaluation unit 415 and/or the processing unit 411.

Operation 509:

The comparing 508 may aid in the user equipment 100 determining 509 at least one similar delay component and/or a similar complex exponential waveform or any other similar parameter of the first and second time and/or frequency representations, respectively. The determining 509 may be performed by the evaluation unit 415 and/or the processing unit 411.

The common sub-component (e.g., common tap) may be determined by comparing the time domain representation, or scatter responses, of the primary channel, $H_{TV}$, 601A with the time domain representation of the secondary channel, $H_{SS}$, 603A. As shown in FIG. 6A, a common tap may be found where the primary and secondary time domain representations 601A and 603A, respectively, are similar such as the taps marked by 605.

FIG. 6B illustrates an example of a common tap in the frequency domain. The two complex exponential waveforms on the bottom of FIG. 6B correspond to channels of the secondary and primary system (excluding the secondary component) respectively, as denoted in the legend. The sum of those two waveforms, depicted in the upper graph of FIG. 6B corresponds to the estimated primary channel. This waveform may be compared with the complex exponential waveform of the secondary channel to determine the common complex exponential waveform. The common waveform can be transformed to the time domain to yield the common tap(s), which is similar to what is illustrated in FIG. 6A.

The common sub-components may represent a portion of the estimated channel which stems from the transmitter which transmits the secondary signal. It should be appreciated that in the determination of the common sub-components, the common sub-component portions of the time or frequency domain representations need not be identical. For example, a common sub-component may be determined if the common sub-component portions of the time or frequency domain representations are similar with respect to a threshold percentage. The threshold percentage may be based on any percentage of similarity and may further be user programmable.

Operation 510:

Operations further comprise the user equipment determining 510 an updated estimation of the secondary channel based on the at least one common sub-component (e.g., at least one common tap). The channel estimation of the primary channel comprising the at least one common sub-component can be used as estimate for the secondary channel for those sub-components. The determining estimation unit 413 and/or the processing unit 411 is configured to update the estimate of the secondary channel based on the at least one sub-component. For example, the secondary channel estimate may be obtained by taking the estimated values from the primary channel of the at least one common sub-component.

Therefore, as described above, an improved estimation of the secondary channel may be provided by obtaining a more precise estimation of the primary channel. According to some example embodiments this may be achieved with the use of the reconstructing 502 and re-estimation 503. Furthermore, estimations are further improved by utilizing common sub-components 506 in the estimation of the secondary channel 510. Thus, relative interference and noise levels in the secondary channel estimation may be reduced.

Pilot Resource Shifting

Some example embodiments may be directed towards pilot resource shifting. Pilot resource shifting may be applicable if the secondary system allows for pilot shifting in the time and/or frequency domain. An example of such a system is a Long Term Evolution (LTE) system where the pilot resources may be shifted in time and/or frequency. Presumably overlap between the pilot resources of the primary and secondary systems may be different based upon the pilot resource shifting in the secondary system. Thus, some example embodiments may be directed towards the optimal shifting of pilot resources of the secondary system. It should be appreciated that some example embodiments may also comprise pilot resource shifting of the primary system.

If the secondary system uses the channel estimate of the primary system as described above the pilot shifting may be selected to maximize the overlap between the pilots, assuming that the non-overlapping pilots of the secondary system are enough to give a rough estimate of the sub-components in the channel representation if needed (e.g., as explained in operation 506). The overlapping pilots may then be suppressed since they will not be used (or will at least not be used for decoding). The suppression may comprise puncturing or muting, which will be described in greater detail below. This allows a larger portion of the secondary resources to be used for data.

Figure 7:
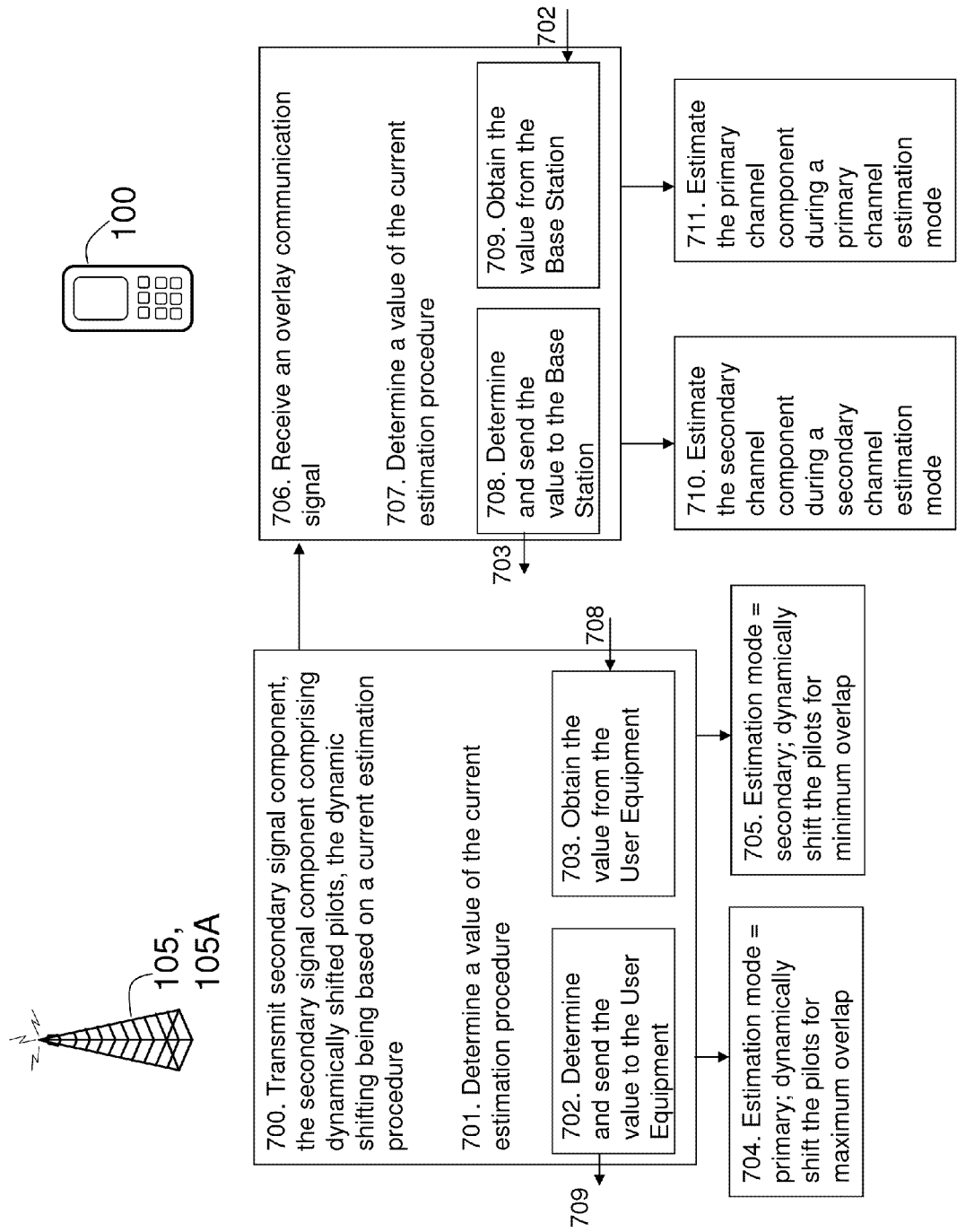
FIG. 7 is a flow diagram depicting example operations for pilot resource shifting which may be performed by the Base Station and/or the user equipment of FIG. 3 and FIG. 4, respectively, according to some of the example embodiments.

The optimization of the pilot shifting is not a time critical parameter to compute since it may be part of configuration (e.g., can be computed off-line). FIG. 7 illustrates a flow diagram depicting example operations which are utilized in the Base Station 105 or 105A and the user equipment 100 of FIGS. 3 and 4, respectively, in providing the shifting of pilot resources and estimation based on the shifting.

Operation 700:

The shifting of pilot resources comprises transmitting 700 from the network node (e.g., Base Station 105 or 105A) the secondary signal component to be received by an user equipment 100. The secondary signal component comprises secondary pilot resources that are dynamically shifted. The dynamic shifting is based on a current estimation procedure.

The communications port 307 is configured to transmit the secondary signal component to an user equipment 100. A shifting unit 313 is configured to dynamically shift secondary pilot resources of the secondary signal component based on a current estimation procedure.

Operation 701:

In this operation the network node (e.g., Base Station 105 or 105A) may determine 701 a value of the current estimation procedure. The determining 701 may be performed by the shifting unit 313 and/or the processing unit 311.

Operation 702:

The operation of determining 701 may further comprise the operation of the network node (e.g., Base Station 105 or 105A) determining 702 the value of the current estimation procedure and thereafter sending said value to the user equipment 100. The value of the current estimation may be useful such that the user equipment 100 may have knowledge of how it should perform channel estimation. Since the determining 702 occurs within the network node, it is the network node which may dictate the value of the estimation procedure and the shifting of pilot resources. The operation of determining 702 may be performed by the shifting unit 313 and/or the processing unit 311.

Operation 703:

The operation of determining 701 may comprise the operation of the network node (e.g., Base Station 105 or 105A) obtaining 703 the value of the current estimation procedure from the user equipment 100. In such an instance, it is the user equipment 100 which may dictate the current estimation mode and the shifting of pilot resources. The operation of obtaining 703 may be performed by the communications ports 307.

Operation 704:

Pilot resource shifting may also comprise the operation of dynamically shifting 704 the secondary pilot resources to provide a maximum overlap with primary pilot resources of the primary signal component, e.g., when the current estimation procedure is a primary estimation procedure. It should be appreciated that the maximizing may comprise any overlap percentage above a certain threshold, wherein the threshold may be an user programmable threshold of any value. The operation of shifting 704 may be performed by the shifting unit 313 or the processing unit 311.

Operation 705:

Pilot resource shifting may also comprise the operation of dynamically shifting 705 the secondary pilot resources to provide a minimum overlap with primary pilot resources of the primary signal component, e.g., when the current estimation procedure is a secondary channel estimation procedure. It should be appreciated that the minimizing may comprise any overlap percentage below a certain threshold, wherein the threshold may be an user programmable threshold of any value. It should further be appreciated that any other threshold may be employed. The operation of shifting 705 may be performed by the shifting unit 313 or the processing unit 311.

Operation 706:

Pilot resource shifting may also comprise a number of operations performed within the user equipment 100, for example operations 706-711. Example operations may comprise the operation of the user equipment 100 receiving 706 from a network node (e.g., Base Station 101, 105 or 105A) a combined wireless communication signal comprising primary and secondary signal components. Secondary pilot resources of the secondary signal component being shifted based on a current estimation procedure.

A communications port 407 is configured to receive from a network node (e.g., Base Station 101, 105 or 105A) a combined wireless communications signal comprising primary and secondary signal components, secondary pilot resources of the secondary signal component are shifted based on a current estimation procedure.

Operation 707:

Operations may also comprise determining 707 the value of the current estimation procedure within the user equipment 100. The operation of determining 707 may be performed by the estimation unit 413 or the processing unit 411.

Operation 708:

The operation of determining 707 may comprise the user equipment 100 determining 708 the value of the current estimation procedure and sending said value to the network node. The network node may receive the sent value as described in relation to operation 703. The operation of determining 708 may be performed by the estimation unit 413 or the processing unit 411.

Operation 709:

The operation of determining 707 may comprise the user equipment 100 obtaining 709 the value of the current estimation procedure from the network node. The value obtained from the network node may be provided as explained in relation to operation 702. The operation of obtaining may be performed by the communications port 407.

Operation 710:

Operations further comprise the user equipment 100 estimating 710 the secondary channel when the current estimation procedure is a secondary channel estimation procedure.

The estimation unit 413 and/or the processing unit 411 are further configured to estimation the secondary channel when the current estimation procedure is a secondary channel estimation procedure.

Operation 711:

Operations further comprise the user equipment 100 estimating 711 the primary channel when the current estimation procedure is a primary channel estimation procedure.

The estimation unit 413 and/or the processing unit 411 are further configured to estimation the primary channel when the current estimation procedure is a primary channel estimation procedure.

Thus, as described above, the shifting of pilot resources may be useful in providing optimized channel estimations. Specifically, during primary channel estimation a maximum overlap of pilot resources may enable a greater number of secondary resources to be used for data. During secondary channel estimation a minimum overlap of pilot resources may reduce interference caused by the primary system on the secondary pilot resources.

It should be appreciated that the shifting of pilot resources may be provided by a series of computer executable instructions stored on a computer readable medium. The optimization of the pilot shifting is not a time critical parameter to compute since it is part of configuration (i.e., can be computed off-line). An example algorithm, or computer executable instructions, for computing an optimal pilot shift is outlined below.

1 Decide the target pilot overlap (e.g., "maximum", "minimum" or somewhere in between (e.g., 30%)), alternatively define a performance metric to optimize.

2 For each possible pilot shift i in the set S where S contains all allowed pilot shifts, compute the pilot overlap (alternatively the metric to optimize) and store it in O(i) where O is an array.

3 Select the pilot shift i where O(i) corresponds best to the target pilot overlap (where the performance metric is optimized) decided in step 1.

It should be appreciated that the instructions provided above were done so merely to provide an example. Any other form of instructions may be utilized.

Cognitive Transmission and Estimation

Figure 8:
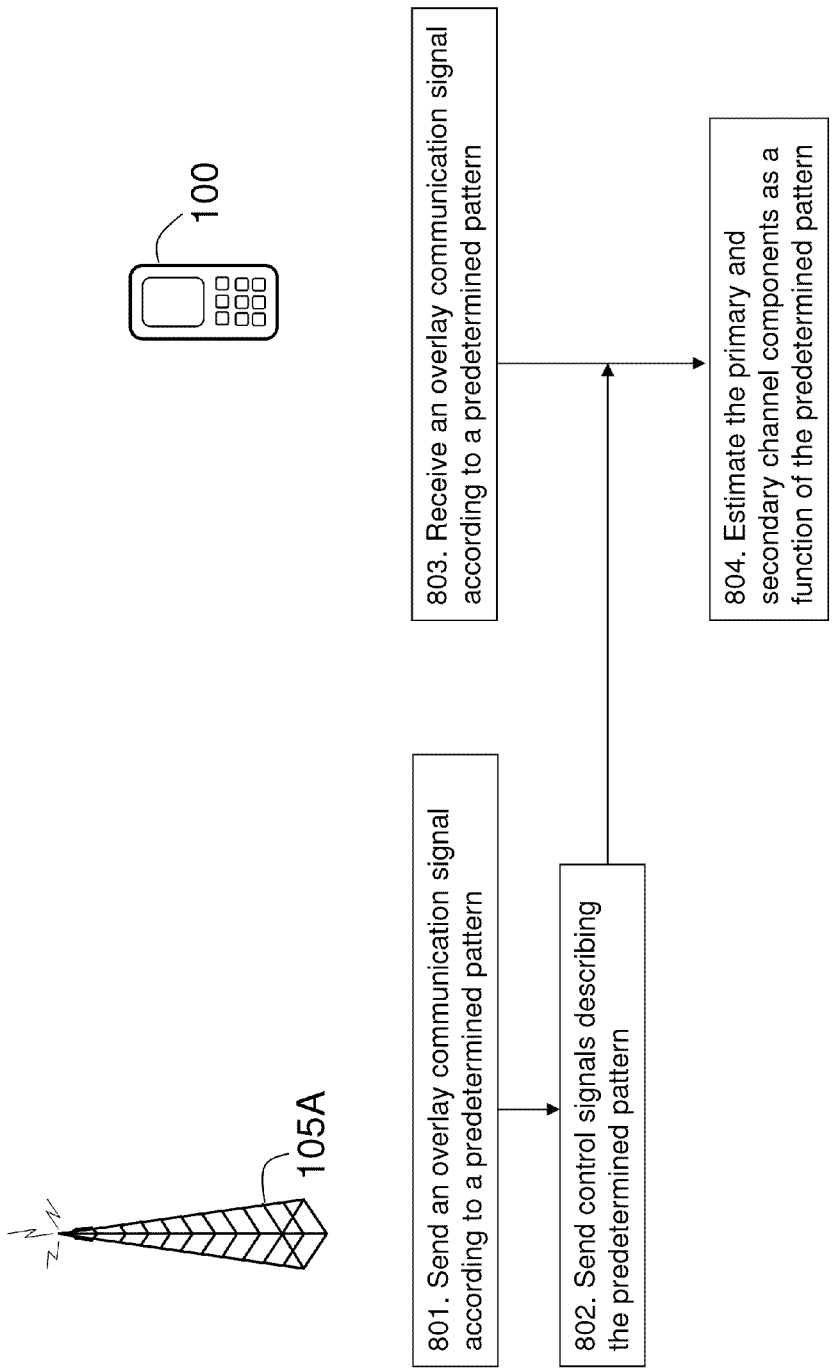
FIG. 8 is a flow diagram depicting example operations for cognitive signal transmission and channel estimation which may be performed by the Base Station and/or the user equipment of FIG. 3 and FIG. 4, respectively, according to some of the example embodiments.

In some example embodiments, cognitive transmission and estimation may be employed. FIG. 8 is a flow diagram depicting example operations performed by a network node (e.g., Base Station 105A) and the user equipment 100 for handling primary and secondary channels, wherein the secondary channel is a sub-component of the primary channel, according to some of the example embodiments.

Operation 801:

Cognitive transmission and estimation may comprise a network node (e.g., Base Station 105A) sending 801 combined wireless communication signals on the secondary channel, which is a subpart of the primary channel, according to a predetermined pattern. The communication ports 307 is configured to send combined wireless communication signals on the secondary channel, which is a subpart of the primary channel, according to a predetermined pattern. Specifically, some example embodiments may comprise an alternating between sending 801 combined wireless communication signals and being quiet (e.g., not sending any signals at all) according to the predetermined pattern.

Operation 802:

Operations may also comprise a network node sending 802 control signals to a cognitive user equipment 100, or an user equipment capable of receiving cognitive data, the control signals may comprise information indicative of the predetermined pattern. The communications port 307 may be further configured to send the control signals to a cognitive user equipment 100, where the control signals may comprise the predetermined pattern. The sending 802 of control signals may be useful to the user equipment 100, as the user equipment may adjust its current estimation procedure based on what is currently being sent.

Operation 803:

Cognitive transmission and estimation may also comprise an user equipment 100 receiving 803 combined wireless communication signals on the primary and secondary channels according to a predetermined pattern.

The communications port 407 is configured to receive combined wireless combination signals on the primary and secondary channels according to a predetermined pattern. Specifically, some example embodiments may comprise alternately receiving 803 combined wireless communication signals on the primary and secondary channels and the primary signal only on the primary channel (from 101 since 105, 105a is quiet).

Operation 804:

Operations may further comprise the operation of the user equipment 100 estimating 804 the primary and secondary channels as a function of the predetermined pattern. As described in relation to operation 802, the user equipment may gain knowledge of the current signal being transmitted via the control signals. It should be appreciated that in some example embodiments, the user equipment 100 may be configured to send a request to the network node that either the primary or secondary signal be sent at any given time.

Thus, as described above, cognitive transmission and estimation may provide improved channel estimations such that when the primary or secondary channel is being estimated, the secondary or primary signal, respectively, may not be transmitted from the cognitive transmitter, according to some example embodiments. Thus, channel estimation interference may be reduced.

Primary Channel Estimation

As described above, in relation to equation (2), the channel estimation performance (e.g., how similar $H_{est}$ is to H) may play a role when it comes to evaluation of the achievable Signal to Interference plus Noise Ratio (SINR) of $Y_{SS}$. However, the overlaid secondary system may add interference to the pilots of the primary system and therefore effect the channel estimation. Thus, some example embodiments may be directed towards increasing the primary system channel estimation performance by suppressing the resources of the secondary system which overlaps with the pilot resources of the primary system. In some example embodiments, suppression may comprise puncturing or muting of the pilot resources.

In an Orthogonal Frequency Division Multiplexing (OFDM) scenario, this means that no or little power may be allocated to the time and/or frequency resources of the secondary system which overlap with the time and/or frequency resources used for channel estimation (e.g., pilots, or reference symbols) in the primary system. According to some example embodiments, a margin could be introduced such that slightly larger resources are left empty in the secondary system. This may reduce leakage effects from the non-empty resources of the secondary system to the pilot resources of the primary system. Leaving larger resource regions empty may be useful if OFDM system parameters do not coincide since then orthogonality between the two systems is not given. Potentially complete OFDM symbol(s) needs to be punctured or muted.

In the suppression of pilot resources, puncturing may be utilized. Puncturing may comprise the process or replacing resource elements with a zero element after rate matching resulting in empty regions. It should also be appreciated that such empty regions may already be considered during rate matching, i.e. no information is mapped onto those resources. This process is referred to as muting. It should further be appreciated that a cancelling signal may be applied to the regions of interest, such that the applied canceling signal results in a reduced power region.

Figure 9:
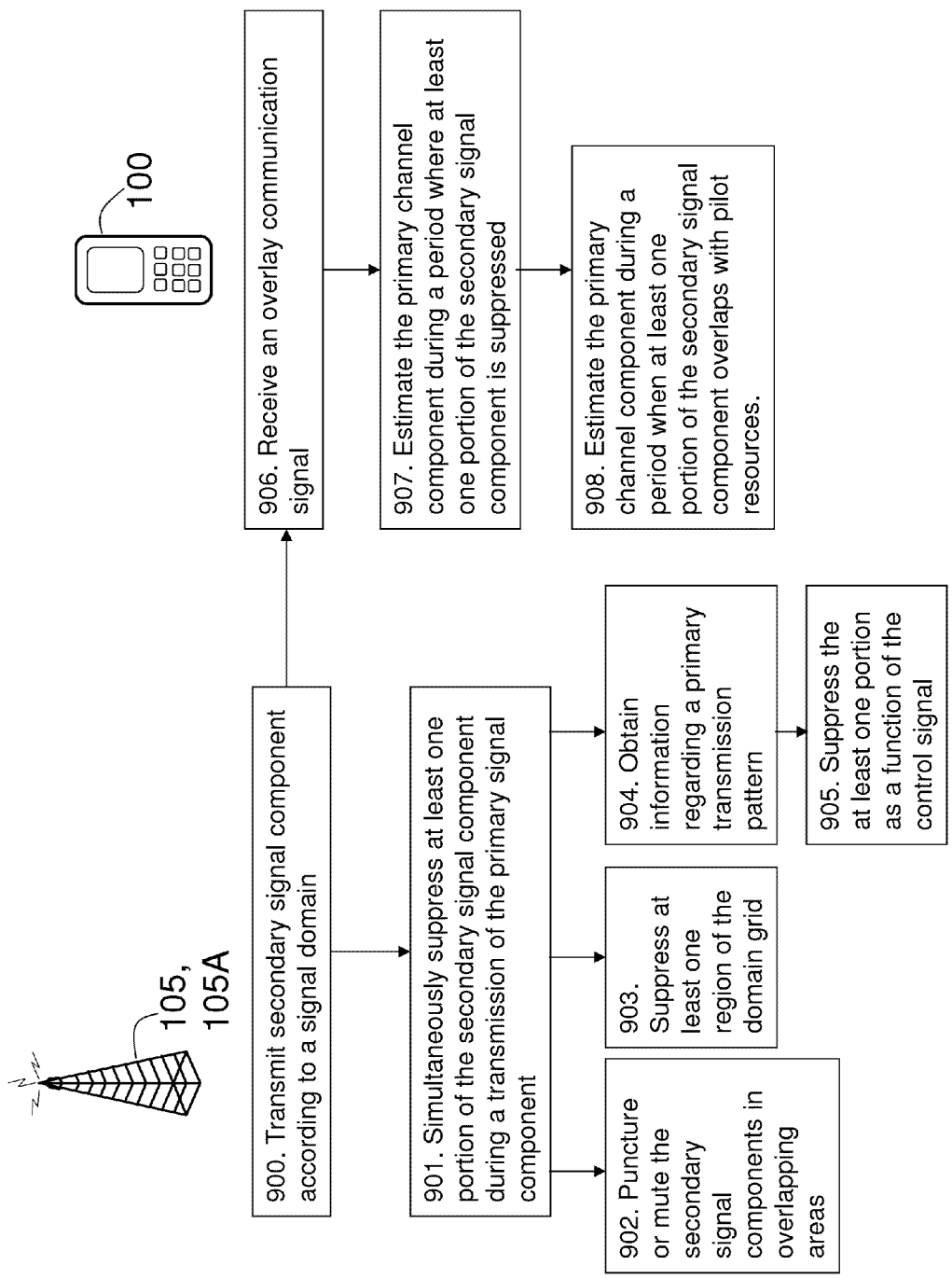
FIG. 9 is a flow diagram depicting example operations for primary channel estimation which may be performed by the Base Station and/or user equipment of FIG. 3 and FIG. 4, respectively, according to some of the example embodiments.

FIG. 9 is a flow diagram illustrating example operations which may be performed by a network node (e.g., Base Station 105 or 105A) and an user equipment 100 with regard to primary channel estimation, according to some of the example embodiments.

Operation 900:

Primary channel estimation may comprise a network node (e.g., Base Station 105 or 105A) transmitting 900 to an user equipment 100 the secondary signal component according to a secondary transmission scheme such that the secondary signal component at least partially overlaps with the primary signal component with respect to a signal domain.

The communications port 307 may be configured to transmit to the user equipment 100 the secondary signal component according to a secondary transmission scheme such that the secondary signal component at least partially overlaps with the primary signal component with respect to a signal domain.

It should be appreciated that the signal domain may be a time, frequency, and/or code domain. It should also be appreciated that the primary and secondary signal components may be transmitted with respect to a domain grid transmission scheme.

FIG. 10A illustrates an example of an overlapping signal transmission comprising primary and secondary signal transmission using a time and frequency domain grid transmission. The primary signal may be transmitted according to a time-frequency primary grid 205. The secondary signal may be transmitted according to a time-frequency secondary grid 207. As illustrated from FIG. 10A, the secondary domain grid may comprise a secondary grid spacing which may be different from a primary grid spacing of a primary domain grid transmission scheme. An example of a primary pilot resource 206 is also provided in FIG. 10A.

Operation 901:

Primary channel estimation also comprises the network node simultaneously suppressing 901 at least one portion of the secondary signal component during the transmission of the primary signal component. The suppression unit 315 and/or processing unit 311 are configured to suppress at least one portion of the secondary signal during a transmission of the primary signal component FIG. 10B provides an example of signal suppression. In the center of the primary grid 205 an 'X' 206 represents a pilot resource symbol. As shown in FIG. 10B, portions of the secondary grid which overlap with the pilot resources of the primary grid 205 may be suppressed (denoted in FIG. 10B as shaded areas). Thus, as the primary channel is being estimated (e.g., with the utilization of the primary pilot resources 206), any interference from the secondary system may be greatly reduced due to the suppression. It should be appreciated that while FIGS. 10A and 10B illustrate the use of a time-frequency grid, any type of grid in the time, frequency, or code domain may be employed.

Operation 902:

As described above, the suppression may comprise the network node puncturing or muting 902 the at least one portion of the secondary signal component which overlaps with pilot resources of the primary signal component. The operation of puncturing or muting 902 may be performed by the suppression unit 315 and/or the processing unit 311. It should be appreciated that the puncturing or muting may be performed together with a cancelling signal such that once the cancelling signal is combined with the secondary signal; the combined signal may experience a reduced (e.g., zero or close to zero) amplitude in the predetermined grid cells.

Operation 903:

Operations may further comprise the network node suppressing 903 at least one region of the secondary domain grid. The operation of suppression 903 may be performed by the suppression unit 315 and/or the processing unit 311.

As shown in FIG. 10B, in some example embodiments for any portion of the secondary grid 207 which overlaps with the primary pilot resource 'X' 206, an entire region of the grid cell may be suppressed. For example, only a portion of the secondary grid cell 208 overlaps with the pilot symbol 206. However, in some example embodiments the entire region of the secondary grid cell 208 may be suppressed in order to improve the primary channel estimation performance. Similarly, in some example embodiments, an entire region of a secondary grid cell 210 may be suppressed even if the cell does not overlap with the primary pilot resource 206. Specifically, secondary grid cells surrounding or in close proximity to the primary pilot resource may be suppressed as well.

Operation 904:

Operations may further comprise the network node being a secondary transmitter and the secondary transmitter obtaining 904 information regarding a transmission pattern of a pilot resource of the primary signal component. A secondary transmitter may be a secondary system transmitter which solely transmits the secondary communication signal. The operation of obtaining 904 may be performed by the communications port 307 and/or the processing unit 311.

Operation 905:

The operation of obtaining 904 may further comprise the secondary transmitter suppressing 905 the at least one portion of the secondary signal component as a function of the information. The operation of suppressing 905 may be performed by the suppression unit 315 and/or the processing unit 311 of the secondary transmitter.

Operation 906:

Operations may further comprise an user equipment 100 receiving 906 a combined wireless communication signal. The primary and secondary signal components being received according to a primary and secondary transmission scheme associated with a primary and secondary signal domain, respectively.

The communications port 407 is configured to receive from a network node (e.g., Base Station 105 or 105A) a combined wireless communication signal comprising primary and secondary signal components, the primary and secondary signal components being received according to a primary and secondary transmission scheme, associated with a primary and secondary signal domain.

Operation 907:

Operations also comprise an user equipment 100 estimating 907 the primary channel when the secondary signal component is suppressed. The estimation unit 413 and/or processing unit 411 are configured to estimate the primary channel during a period when the secondary channel is suppressed.

Operation 908:

The operation of estimating 907 may comprise the User Equipment 100 estimating 908 the primary channel during a period when the at least one portion of the secondary signal component overlaps with a pilot resource of the primary signal component. For example, even if only a small portion of a grid cell overlaps with the pilot resource, an entire region of the grid cell of the secondary signal may be suppressed, as explained in relation to operation 903. The operation of estimating may be performed by the estimation unit 413 and/or the processing unit 411.

Thus, as described above, primary channel estimation may be improved with the use of suppression, according to some example embodiments. The use of suppression may reduce interference during estimation.

Conclusion

Some example embodiments may comprise a portable or non-portable telephone, media player, Personal Communications System (PCS) terminal, Personal Data Assistant (PDA), laptop computer, palmtop receiver, camera, television, radar and/or any appliance that comprises a transducer designed to transmit and/or receive radio, television, microwave, telephone and/or radar signals. The device according to the example embodiments is however intended for use particularly, but not exclusively for high frequency radio equipment.

The foregoing description of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method in a network node for transmitting a combined wireless communication signal, wherein the combined wireless communication signal comprises a primary and a secondary signal component, the network node is configured for operation in a radio network, and the method comprises:
    shifting secondary pilot resources of the secondary signal component relative to primary pilot resources in the primary signal component by an amount that is based on whether a current estimation procedure at a user equipment is a primary channel estimation procedure or a secondary channel estimation procedure;
    transmitting the secondary signal component to be received by the user equipment.

2. The method of claim 1, wherein the network node is a Base Station.

3. The method of claim 1, further comprising determining whether the current estimation procedure is the primary channel estimation procedure or the secondary channel estimation procedure and sending a corresponding value to the user equipment, to indicate to the user equipment whether the current estimation procedure is the primary channel estimation procedure or the secondary channel estimation procedure.

4. The method of claim 1, further comprising obtaining a value from the user equipment and determining from the value whether the current estimation procedure is the primary channel estimation procedure or the secondary channel estimation procedure.

5. The method of claim 1, wherein, for the case where the current estimation procedure is the primary channel estimation procedure, shifting the secondary pilot resources comprises shifting the secondary pilot resources so as to provide a maximum overlap with the primary pilot resources of the primary signal component.

6. The method of claim 1, wherein, for the case where the current estimation procedure is the secondary channel estimation procedure, shifting the secondary pilot resources comprises shifting the secondary pilot resources so as to provide a minimum overlap with the primary pilot resources of the primary signal component.

7. The method of claim 1, wherein the primary signal component is a broadcast communication signal.

8. The method of claim 1, wherein the secondary signal component is a broadband communication signal.

9. A method in a user equipment for estimating a primary and a secondary channel, wherein the secondary channel is a subset of the primary channel, wherein the user equipment is configured for operation in a radio network and the method comprises:
    receiving from a network node a combined wireless communication signal comprising primary and secondary signal components, wherein secondary pilot resources of the secondary signal component are shifted relative to primary pilot resources of the primary signal component by an amount that is based on whether a current estimation procedure is a primary channel estimation procedure or a secondary channel estimation procedure;
    estimating the primary channel when the current estimation procedure is the primary channel estimation procedure; and
    estimating the secondary channel when the current estimation procedure is the secondary channel estimation procedure.

10. The method of claim 9, wherein the network node is a Base Station.

11. The method of claim 9, wherein the user equipment determines whether the current estimation procedure is the primary channel estimation procedure or the secondary channel estimation procedure, and sends a corresponding value to the network node.

12. The method of claim 9, further comprising obtaining a value of the current estimation procedure from the network node, which value indicates to the user equipment whether the current estimation procedure is the primary channel estimation procedure or the secondary channel estimation procedure.

13. The method of claim 9, wherein the secondary pilot resources have a maximum overlap with primary pilot resources of the primary signal component for the primary channel estimation procedure.

14. The method of claim 9, wherein the secondary pilot resources have a minimum overlap with primary pilot resources of the primary signal component for the secondary channel estimation procedure.

15. The method of claim 9, wherein the primary signal component is a broadcast communication signal.

16. The method of claim 9, wherein the secondary signal component is a broadband communication signal.

17. A network node for transmitting a combined wireless communication signal, the combined wireless communication signal comprising a primary and a secondary signal component, wherein the network node is configured for operation in a radio network and comprises:
- a communications port configured to transmit the secondary signal component to a user equipment; and
- a processing circuit configured to shift secondary pilot resources of the secondary signal component relative to primary pilot resources of the primary signal component by an amount that is based on whether a current estimation procedure at the user equipment is a primary channel estimation procedure or a secondary channel estimation procedure.

18. The network node of claim 17, wherein the network node is a Base Station.

19. The network node of claim 17, wherein the primary signal component is a broadcast communication signal.

20. The network node of claim 17, wherein the secondary signal component is a broadband communication signal.

21. A user equipment for estimating a primary and a secondary channel, wherein the secondary channel is a subset of the primary channel and the user equipment is configured for operation in a radio network and comprises:
- a communications port configured to receive from a network node a combined wireless communication signal comprising primary and secondary signal components, wherein secondary pilot resources of the secondary signal component are shifted relative to primary pilot resources of primary signal component by an amount that is based on whether a current estimation procedure is a primary channel estimation procedure or a secondary channel estimation procedure;
- a processing circuit configured to estimate the primary channel when the current estimation procedure is the primary channel estimation procedure, and to estimate the secondary channel when the current estimation procedure is the secondary channel estimation procedure.

22. The user equipment of claim 21, wherein the network node is a Base Station.

23. The user equipment of claim 21, wherein the primary signal component is a broadcast communication signal.

24. The user equipment of claim 21, wherein the secondary signal component is a broadband communication signal.

* * * * *